US012656667B1

(12) United States Patent
Zheng et al.

(10) Patent No.: US 12,656,667 B1
(45) Date of Patent: Jun. 16, 2026

(54) FILM DISC FOR STORY PROJECTOR

(71) Applicant: Shenzhen Bolong Technology Co. Ltd., Shenzhen City (CN)

(72) Inventors: Huazhu Zheng, Shenzhen City (CN); Caijian Zheng, Shenzhen City (CN); Wenzhen Ouyang, Shenzhen City (CN); Yunyun Lu, Shenzhen City (CN)

(73) Assignee: Shenzhen Bolong Technology Co. Ltd., Shenzhen City (CN)

( * ) Notice: Subject to any disclaimer, the term of this patent is extended or adjusted under 35 U.S.C. 154(b) by 0 days.

(21) Appl. No.: 19/365,673

(22) Filed: Oct. 22, 2025

(30) Foreign Application Priority Data

Sep. 30, 2025 (CN) ......................... 202522132430.5

(51) Int. Cl.
| | |
|---|---|
| *G03B 21/00* | (2006.01) |
| *G03B 21/02* | (2006.01) |
| *G03B 31/06* | (2021.01) |
| *G09B 5/06* | (2006.01) |

(52) U.S. Cl.
CPC .......... *G03B 21/001* (2013.01); *G03B 21/02* (2013.01); *G03B 31/06* (2013.01); *G09B 5/067* (2013.01)

(58) Field of Classification Search
CPC ...... G03B 21/001; G03B 21/02; G03B 31/06; G09B 5/067
See application file for complete search history.

(56) References Cited

U.S. PATENT DOCUMENTS

| | | | | |
|---|---|---|---|---|
| 5,759,104 | A | * 6/1998 | Shirae | .................. H05K 5/0256 439/361 |
| 12,385,624 | B2 | 8/2025 | Johnson et al. | |
| 2006/0126030 | A1* | 6/2006 | Jin | ......................... G03B 21/14 353/84 |
| 2011/0164193 | A1 | 7/2011 | Hao | |
| 2020/0090535 | A1* | 3/2020 | Lee | ......................... G02B 27/18 |

FOREIGN PATENT DOCUMENTS

| | | | | | |
|---|---|---|---|---|---|
| CN | 212847220 | U | * | 3/2021 | |
| CN | 118605075 | A | * | 9/2024 | ............. G09B 5/067 |
| WO | 2018108113 | A1 | | 6/2018 | |
| WO | 2018149104 | A1 | | 8/2018 | |

* cited by examiner

*Primary Examiner* — Ryan D Howard

(57) ABSTRACT

The present invention provides a film disc for a story projector, configured to be inserted into a story projector main body to achieve synchronous playback of images and audio. The film disc includes a housing, a rotating disc, and an audio module. The housing is provided with a projection hole and a driving hole. The rotating disc is rotatably installed in the housing and is provided with a film sheet corresponding to the projection hole, and one side of the rotating disc is provided with a transmission member configured to mesh with a driving assembly of the story projector main body. The audio module includes an audio board and a storage unit, the storage unit stores audio data corresponding to an image on the film sheet, and the audio board is installed on the housing for data interaction with the main body.

10 Claims, 7 Drawing Sheets

FIG. 2

FILM DISC FOR STORY PROJECTOR

CROSS-REFERENCE TO RELATED APPLICATIONS

The application claims priority of Chinese patent application 202522132430.5, filed on Sep. 30, 2025, which is incorporated herein by reference in its entireties.

TECHNICAL FIELD

The present invention relates to the technical field of projectors, and in particular, to a film disc for a story projector.

BACKGROUND

In existing early childhood educational devices, projection-type story machines mostly achieve image playback using a digital projection technology. These devices project images through a high-brightness light source combined with a digital imaging module. Although clear dynamic images are presented, the strong light easily stimulates the eyes of children. As a result, the devices are particularly unsuitable for bedtime soothing scenarios. In addition, some conventional story projectors use a film-type projection structure to switch content by manually replacing the film. Alignment of the first-frame image of the film with a projection lens is required; otherwise, image and audio playback may become unsynchronized. Meanwhile, audio data is typically stored in a built-in memory of the device, and both the film and the storage medium need to be operated separately in a case where the story content is changed, resulting in cumbersome steps and poor user experience.

SUMMARY

A primary objective of the present invention is to provide a film disc for a story projector, which aims to improve the practicality of the film disc for a story projector.

To achieve the above objective, a film disc for a story projector proposed by the present invention is configured to be inserted into a story projector main body, so that the story projector plays audio and images on the film disc, and includes:

a housing, wherein the housing is provided with a projection hole and a driving hole;

a rotating disc, wherein the rotating disc is rotatably disposed within the housing, a film sheet is provided in the rotating disc, an image on the film sheet corresponds to a position of the projection hole, one side of the rotating disc is provided with a transmission member, and the transmission member corresponds to the driving hole; and an audio module, wherein the audio module includes an audio board and a storage unit provided on the audio board, the storage unit stores audio data corresponding to the image on the film sheet, and the audio board is installed on the housing for transmitting data with the story projector main body.

Preferably, the housing is provided with a data hole, and the audio board is embedded in the data hole.

Preferably, an assembly groove is provided on an outer wall of the housing, the data hole is formed in a bottom wall of the assembly groove, the audio board is provided with a transmission connector, and the transmission connector extends through the data hole into the assembly groove.

Preferably, the transmission connector of the audio board is provided with metal contacts for plug-in electrical connection with a film recognition female socket of the story projector main body.

Preferably, a fixing post is provided inside the housing, a fixing hole cooperating with the fixing post is formed on the audio board, and the audio board is fixed to the fixing post through the fixing hole.

Preferably, positioning holes are formed on the housing and the rotating disc, and the positioning holes are configured to cooperate with a positioning module of the story projector main body to trigger rotational reset of the rotating disc.

Preferably, the positioning module is an infrared positioning module.

Preferably, the transmission member is a face gear.

Preferably, an installation seat is provided as a protrusion on an inner wall of the housing at a position corresponding to the driving hole, and the face gear is located within the installation seat.

Preferably, a limiting post is provided on one side of the rotating disc opposite to the face gear, and a limiting hole cooperating with the limiting post is formed in the housing.

Preferably, limiting seats are provided on the inner wall of the housing at positions corresponding to two opposite sides of the rotating disc, and the limiting seats movably abut against a side wall of the rotating disc.

Preferably, the housing includes a front housing and a rear housing, the front housing and the rear housing are fastened together to form an installation cavity, and the rotating disc and the audio module are disposed within the installation cavity.

The present invention provides a film disc for a story projector, which includes a housing, a rotating disc, and an audio module. The housing is provided with a projection hole and a driving hole. The rotating disc is rotatably installed within the housing and accommodates a plurality of film sheets, the images on the film sheets corresponding to the projection hole, and one side of the rotating disc is provided with a transmission member for driving rotation by the story projector main body. The audio module includes an audio board and a storage unit, and is installed on the housing for data transmission with the story projector main body. This structure switches images through the rotating disc which rotates mechanically, avoiding strong light from an electronic screen and protecting the vision of children. The audio module is integrated into the film disc, so that the images correspond synchronously with the audio, simplifying story replacement operations. The structure is modular and easily pluggable, improving usability and interactivity, thereby effectively enhancing the practicality of the story projector.

BRIEF DESCRIPTION OF THE DRAWINGS

To more clearly illustrate the technical solutions in the embodiments of the present invention or in the prior art, the drawings required to be used in the description of the embodiments or the prior art are briefly introduced below. It is obvious that the drawings in the description below are only some embodiments of the present invention, and those of ordinary skill in the art can obtain other drawings according to structures illustrated in these drawings without creative efforts.

Figure 2:
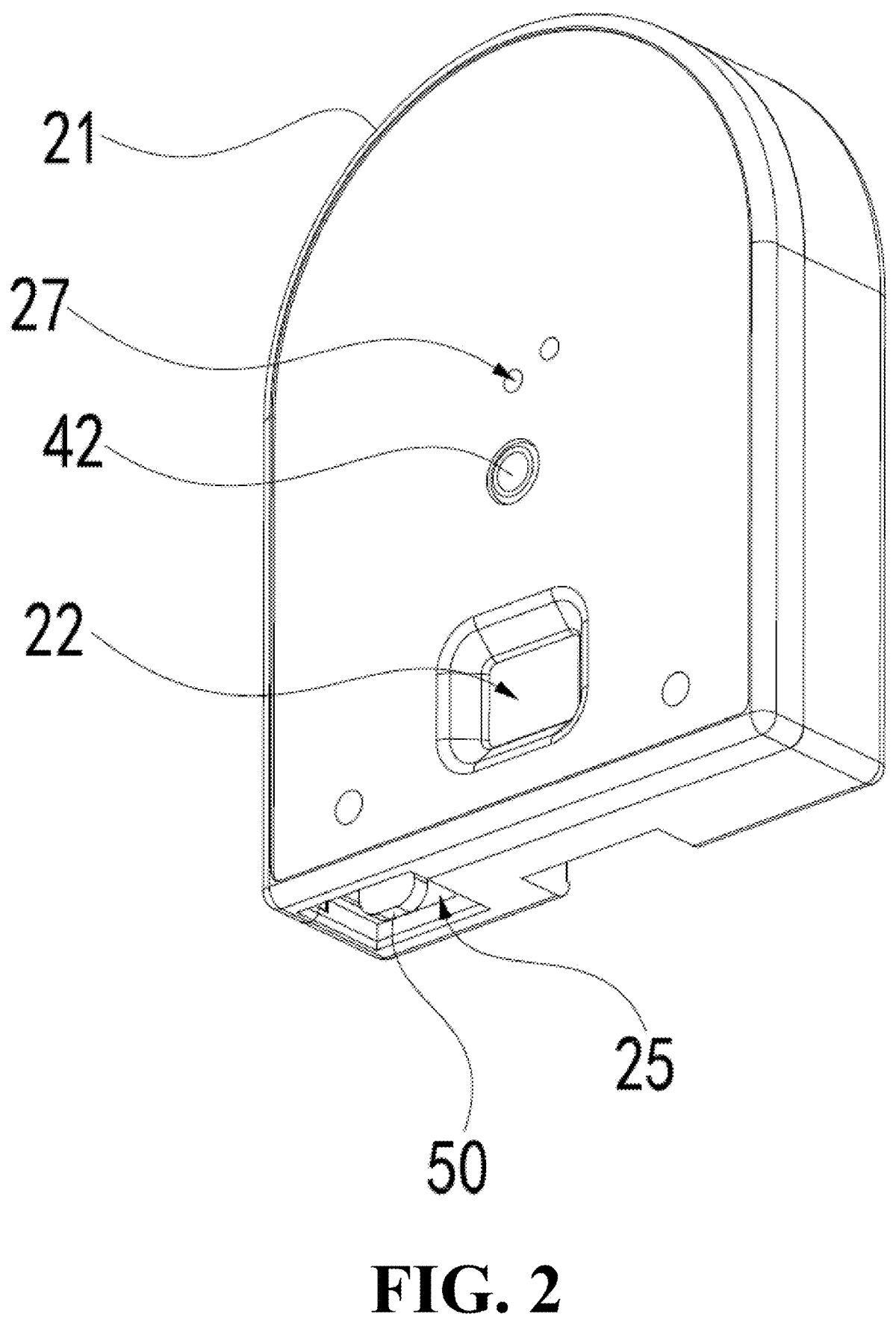

FIG. 2 is a schematic diagram of a structure of a film disc for a story projector according to the present invention from another angle;

DESCRIPTIONS OF REFERENCE NUMERALS

Figure 1:
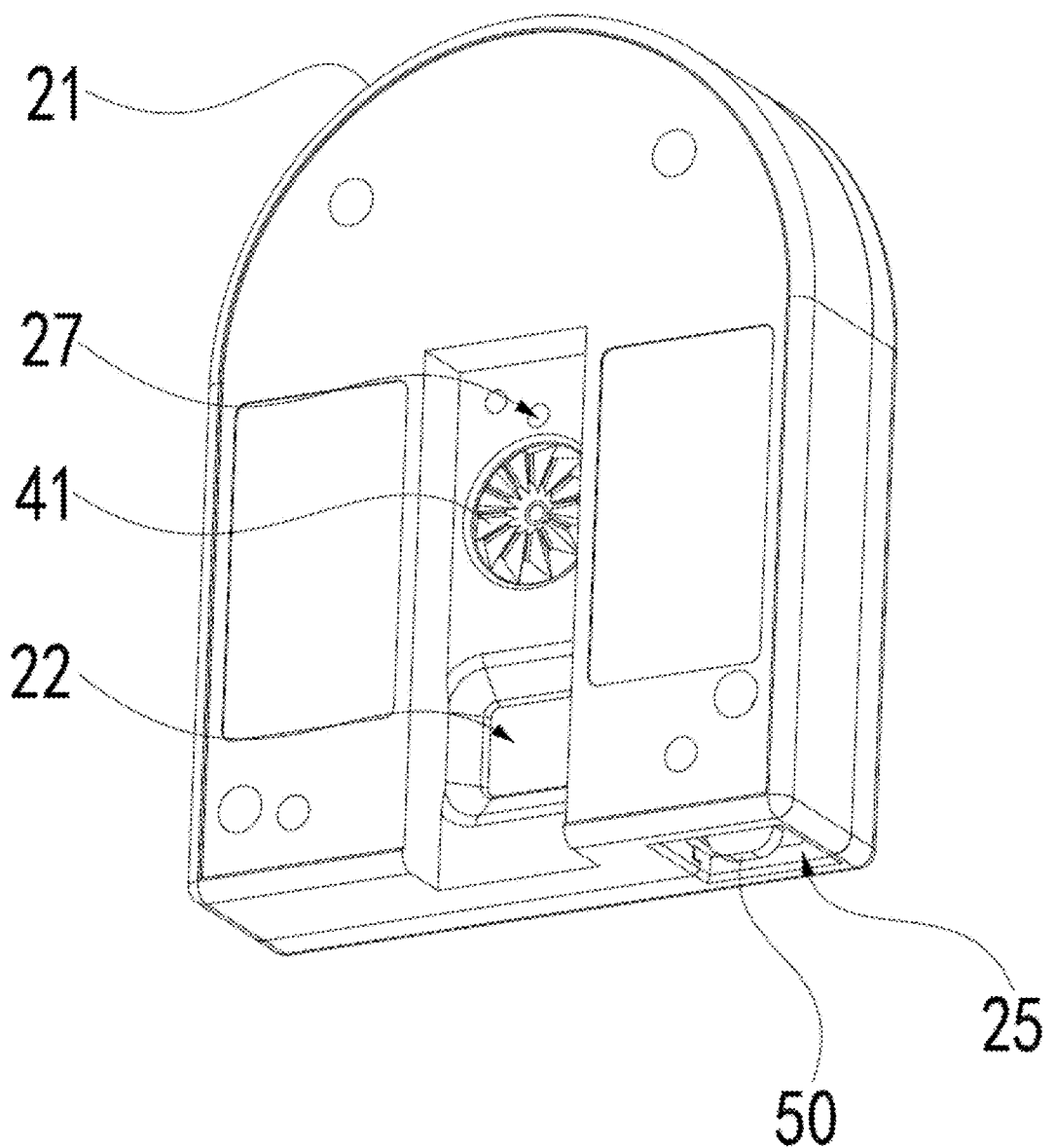
FIG. 1 is a schematic diagram of a structure of a film disc for a story projector according to the present invention from one angle.

10. story projector main body; 11. driving assembly; 12. recognition female socket; 13. positioning module; 14. optical assembly; 20. film disc; 21. housing; 211. front housing; 212. rear housing; 213. installation cavity; 22. projection hole; 23. driving hole; 24. data hole; 25. assembly groove; 26. fixing post; 27. positioning hole; 28. installation seat; 29. limiting hole; 30. limiting seat; 40. rotating disc; 41. face gear; 42. limiting post; 50. audio module; 51. audio board; 511. transmission connector; 512. fixing hole; and 52. storage unit.

The realization of the objectives, the functional features, and the advantages of the present invention will be further explained in conjunction with the embodiments and with reference to the drawings.

DETAILED DESCRIPTION OF THE EMBODIMENTS

The technical solutions in the embodiments of the present invention will be clearly and completely described below with reference to the drawings in the embodiments of the present invention. It is apparent that the described embodiments are only some, but not all, embodiments of the present invention. Based on the embodiments of the present invention, all other embodiments obtained by those of ordinary skill in the art without creative efforts fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present invention, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be implemented by those of ordinary skill in the art. When the combination of the technical solutions is contradictory or cannot be implemented, such a combination of the technical solutions should not be considered to exist, and is not within the protection scope of the present invention.

This embodiment provides a film disc 20 for a story projector, wherein the film disc 20 is configured to be inserted into a story projector main body 10, so that the projector can read image and audio data stored in the film disc 20 to achieve synchronous playback of story content.

As shown in FIGS. 1 to 7, the film disc 20 includes a housing 21, a rotating disc 40, and an audio module 50.

The housing 21 is a hollow structure, and an installation cavity 213 is formed inside the housing to accommodate the rotating disc 40 and the audio module 50. The housing 21 is provided with a projection hole 22, a driving hole 23, and a data hole 24. In a case where the film disc 20 is assembled into the story projector main body 10, an outer shape of the housing 21 corresponds to a shape and dimension of a slot in the main body, so that the film disc 20 is stably embedded in the installation position of the main body through an insertion action. In this case, the projection hole 22 is aligned with a light-emitting path of an optical assembly 14 of the projector to ensure that the projection beam can pass through the film sheet and project images onto an external screen or wall; the driving hole 23 corresponds to the driving assembly 11 inside the projector for transmitting rotational power; and the data hole 24 corresponds to an electrical interface inside the projector to enable data communication.

The rotating disc 40 is rotatably installed inside the housing 21, and cooperates with a supporting structure of the housing 21 through a central rotating shaft to allow smooth rotation within the housing 21. The rotating disc 40 is embedded with a film sheet, and the film sheet carries a plurality of static image frames, each of which corresponds to a position of the projection hole 22. When the rotating disc 40 rotates, different images sequentially pass through the projection hole 22 to achieve image switching. A transmission member, preferably in the form of a face gear 41, is provided on one side of the rotating disc 40, and the face gear 41 meshes with a driving gear in the story projector main body 10. In a case where an internal motor of the projector is activated, the rotating disc 40 is driven to rotate through gear transmission, bringing different images into the optical path to achieve automatic switching playback. Through this structure, a user only needs to insert the film disc 20 to automatically complete the driving connection without manual alignment, thereby improving operational convenience and reliability.

The audio module 50 includes an audio board 51 and a storage unit 52, and the storage unit 52 stores audio data corresponding to images on the film sheets one by one to achieve synchronous playback of images and audio. The audio board 51 is embedded in an assembly groove 25 on an outer wall of the housing 21, the data hole 24 is formed at a bottom of the assembly groove 25, and the transmission connector 511 of the audio board 51 extends through the data hole 24 into the assembly groove 25 and, after being inserted into the story projector main body 10, precisely mates with a recognition female socket 12 of the main body. Metal contacts on the audio board 51 form a plug-in electrical connection with the recognition female socket 12 of the projector. After the main body recognizes the film disc 20, the main body can automatically read data files from the audio module 50 to output matching audio simultaneously with the projection of images, thereby ensuring content synchronization and avoiding misalignment. This structural design facilitates rapid replacement of different story content, and replacing the film disc 20 alone can complete an overall update of images and audio.

To ensure stable installation of the audio board 51, fixing posts 26 are provided on the inner wall of the housing 21, and fixing holes 512 corresponding to the fixing posts 26 are formed on the audio board 51. The audio board 51 is secured inside the housing 21 by screws or clips to prevent loosening or displacement caused by insertion and removal operations, thereby ensuring long-term stability.

To achieve an accurate reset of the rotating disc 40, positioning holes 27 are formed on the housing 21 and the rotating disc 40. After insertion into the main body, a positioning module 13 (preferably an infrared positioning module 13) inside the main body cooperates with the positioning holes 27 to detect the position of the rotating disc 40 during rotation, thereby achieving precise frame-to-frame positioning and ensuring accurate synchronization during image switching. The initial position and rotation angle of the rotating disc 40 may be identified in real time through infrared detection, thereby ensuring that each playback starts from a fixed image and preventing misaligned playback.

As shown in FIGS. 1 to 4, the transmission member is a face gear 41, which is installed in an installation seat 28 on the inner wall of the housing 21. The installation seat 28 is configured to support the face gear 41 and ensures that the gear teeth remain stably meshed with a driving gear inside the main body. The face gear 41 has a large meshing contact area, which allows the transmission to maintain good performance even in the presence of slight positional deviations during insertion and removal, thereby ensuring smooth and stable rotation of the rotating disc 40.

A limiting post 42 is provided on one side of the rotating disc 40 opposite to the face gear 41, and a limiting hole 29 cooperating with the limiting post 42 is formed on the housing 21, thereby limiting the rotation range of the rotating disc 40 and preventing excessive rotation that could cause misalignment between the film sheet and the optical path. Mechanical limiting ensures that the rotating disc 40 always operates within a designed angular range, thereby improving control precision.

Figure 3:
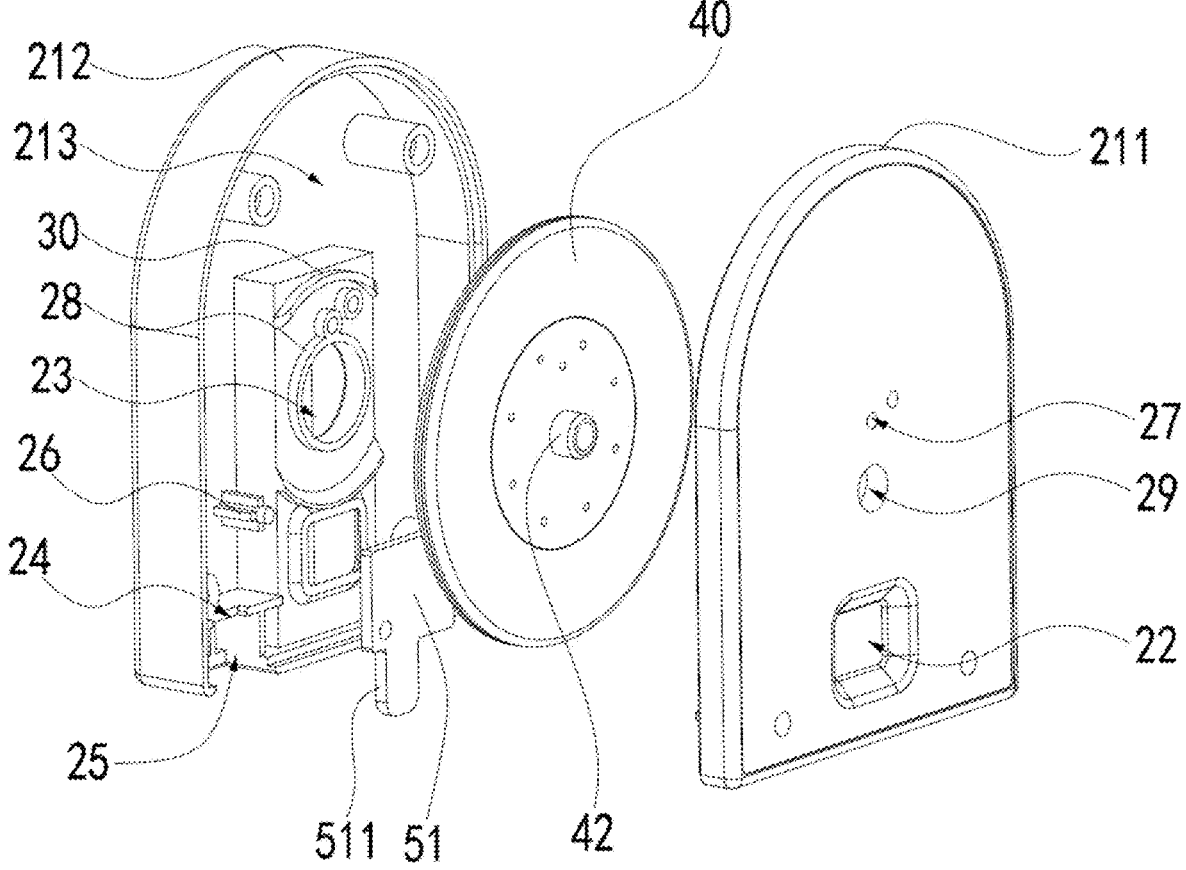
FIG. 3 is a schematic diagram of an exploded structure of a film disc for a story projector according to the present invention from one angle.
Figure 4:
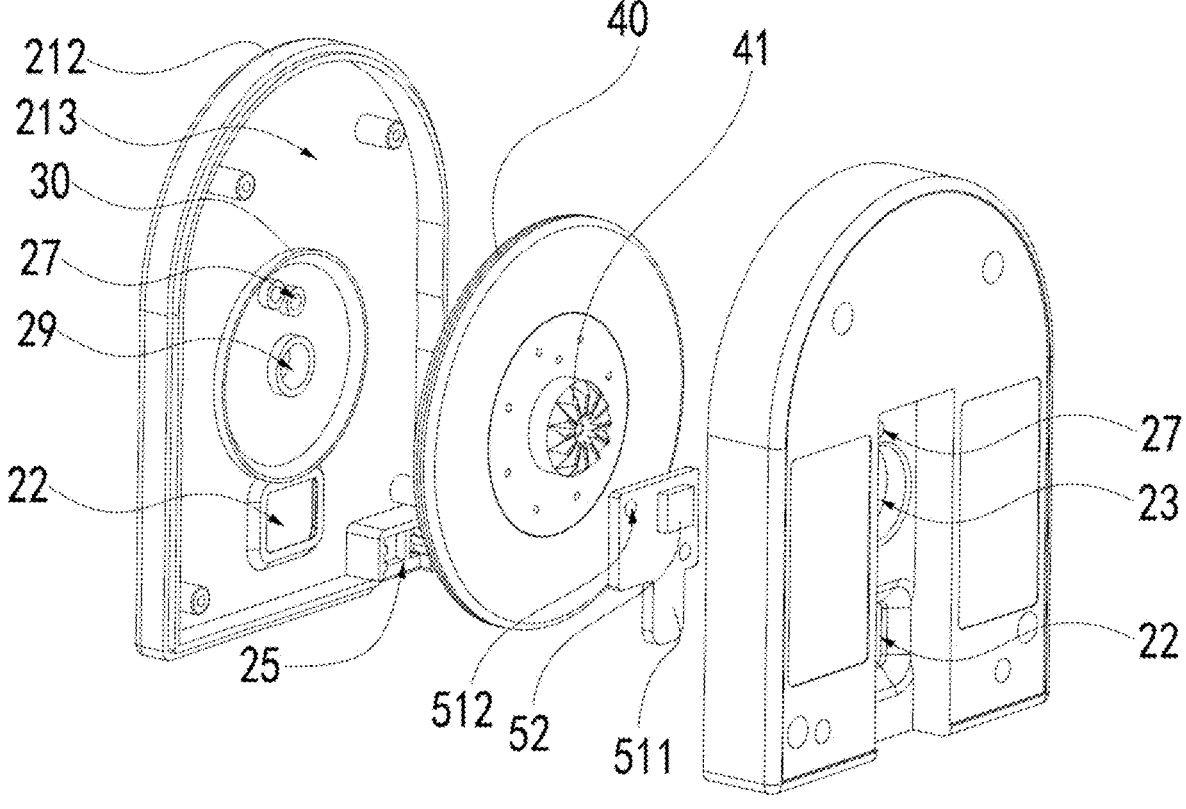
FIG. 4 is a schematic diagram of an exploded structure of a film disc for a story projector according to the present invention from another angle.
Figure 5:
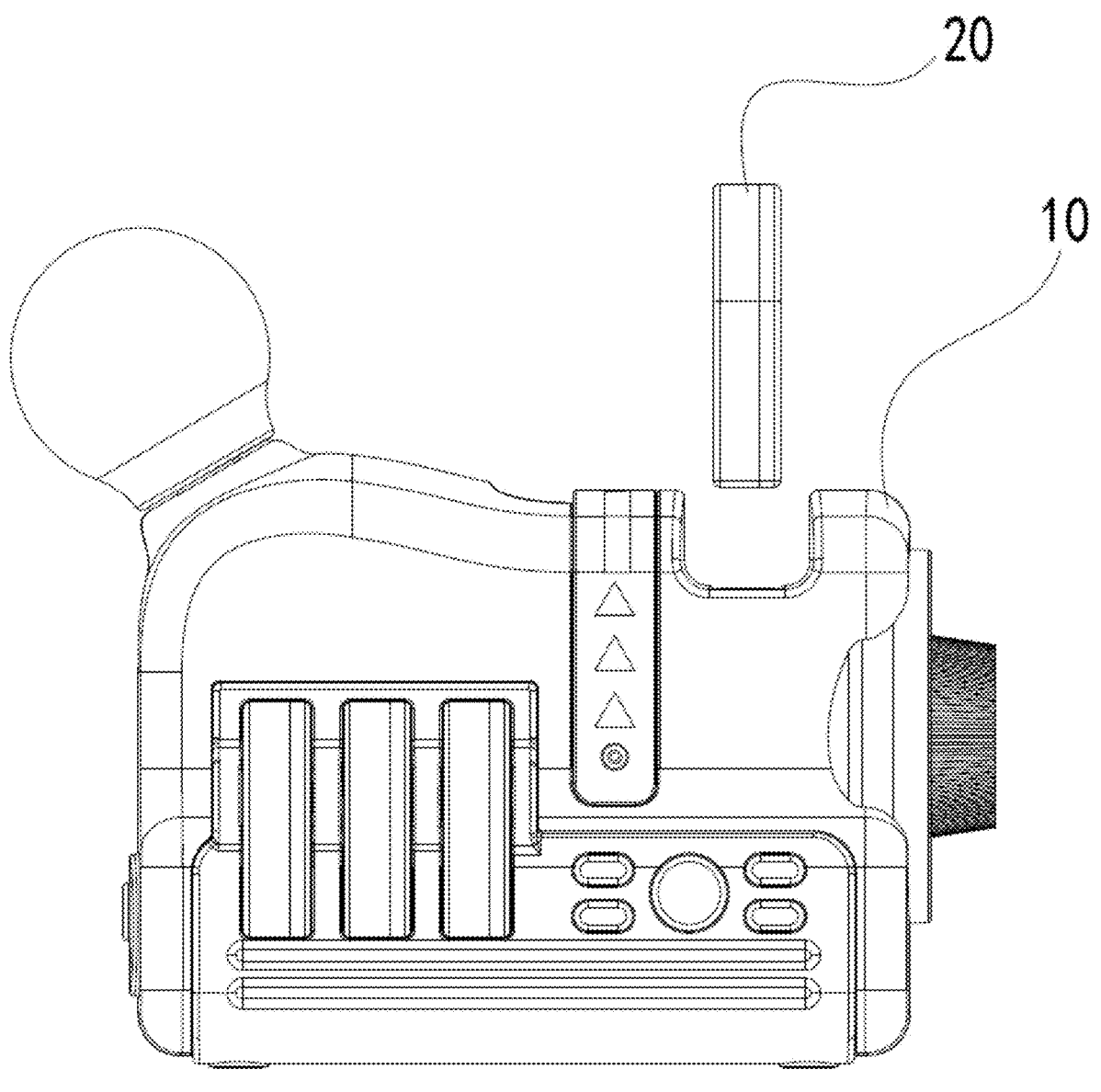
FIG. 5 is a schematic diagram of an exploded structure of an embodiment of a story projector.
Figure 6:
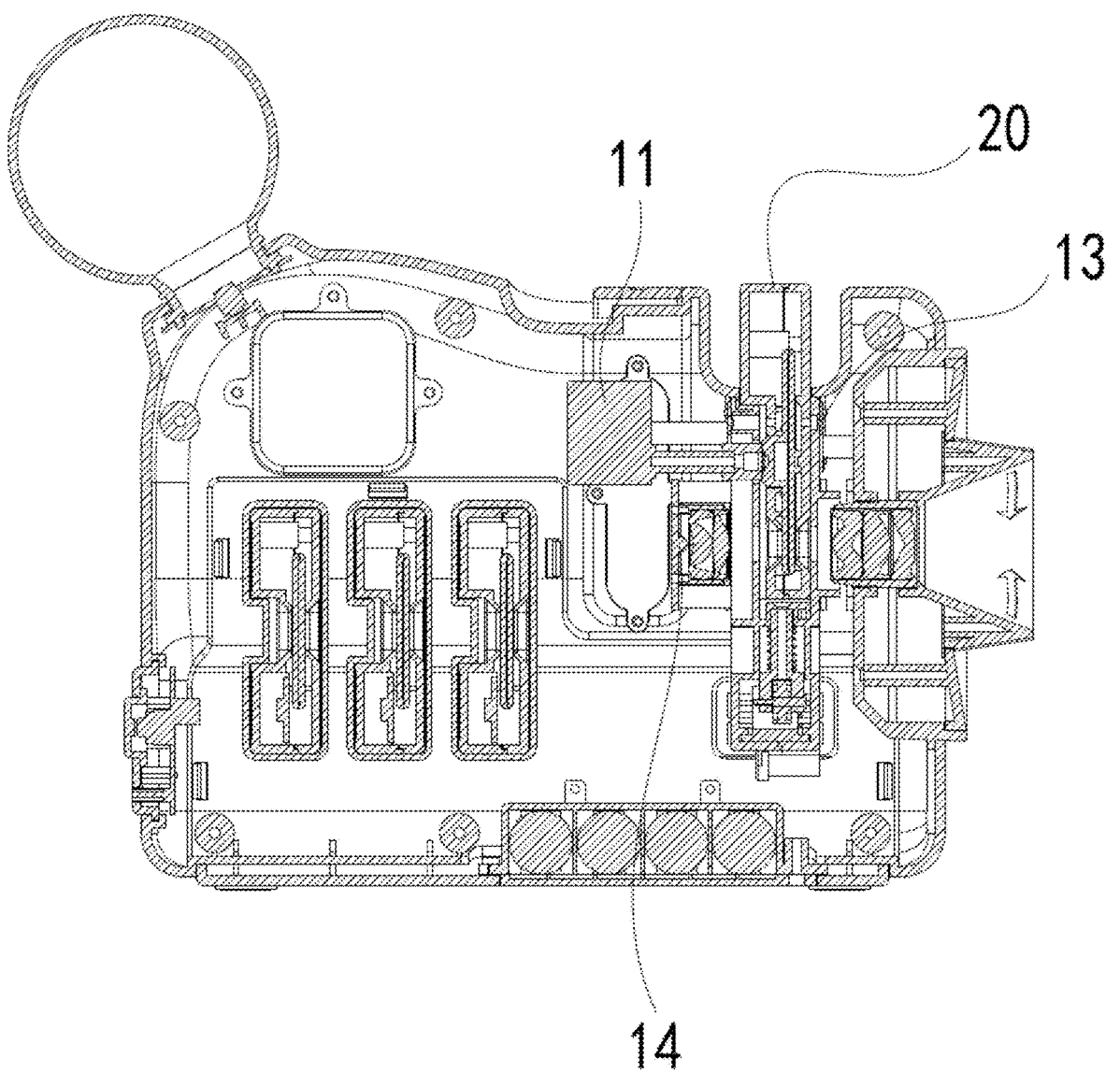
FIG. 6 is a schematic diagram of a cross-sectional structure of a story projector from one angle.
Figure 7:
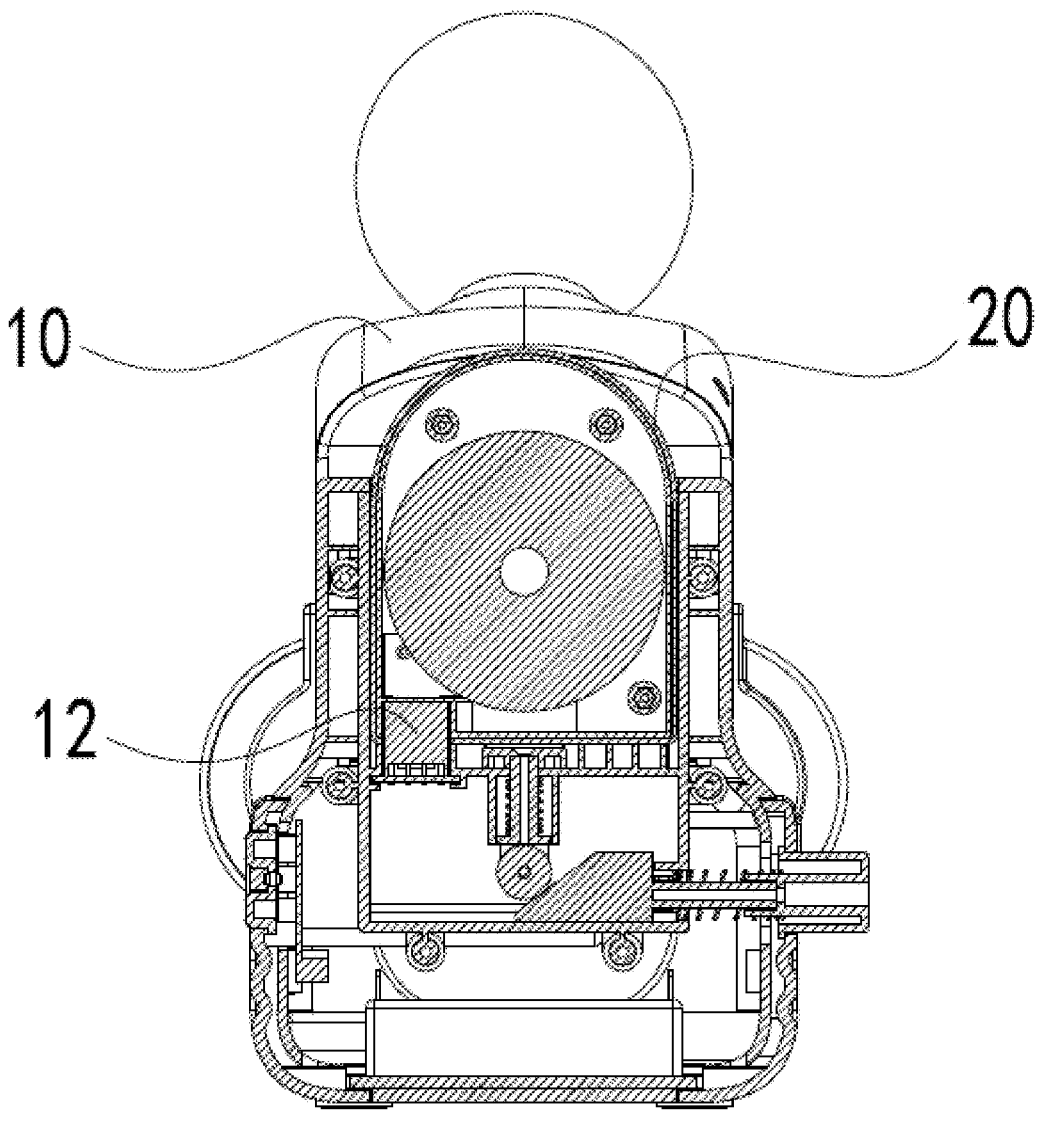
FIG. 7 is a schematic diagram of a cross-sectional structure of a story projector from another angle.

As shown in FIGS. 3 and 4, to further maintain rotational stability, limiting seats 30 are provided on the inner wall of the housing 21 at opposite sides of the rotating disc 40, and the limiting seats 30 movably abut against the side wall of the rotating disc 40, so that the rotating disc 40 is stably supported by the limiting seats 30 at two sides during rotation, thereby preventing shaking and tilting and ensuring smooth rotation and precise image alignment.

As shown in FIGS. 3 and 4, the housing 21 adopts a split structure including a front housing 211 and a rear housing 212, and the two parts are secured by clips or screws to form an installation cavity 213, facilitating assembly and maintenance of the rotating disc 40 and the audio module 50.

Through the above structural design, precise coordination among the optical path, electrical signals, and mechanical transmission is achieved between the film disc 20 and the story projector main body 10. The insertion action simultaneously completes all three types of connections, thereby simplifying user operation. The rotation of the rotating disc 40 is driven by a motor in the main body through the face gear 41, enabling automatic switching of images; the audio module 50 automatically interfaces with the main body circuitry to synchronously play audio, thereby achieving high synchronization between images and audio and improving playback effect and user experience. The positioning module 13 cooperates with the limiting structure to achieve precise reset and frame synchronization of the rotating disc 40, thereby preventing misalignment. The overall structure is compact and stably installed, assembly is simple, and replacement of different film discs 20 is convenient, thereby meeting the requirements of multi-story scenario applications.

The above mentioned contents are only optional embodiments of the present invention and are not intended to limit the patent scope of the present invention, and under the invention concept of the present invention, the equivalent structural transformations made by using the contents of the specification and the drawings of the present invention, or direct/indirect applications to other related technical fields, are all included in the patent protection scope of the present invention.

The invention claimed is:

1. A film disc for a story projector, configured to be inserted into a story projector main body to enable the story projector to play audio and images on the film disc, comprising:

a housing, wherein the housing is provided with a projection hole and a driving hole;

a rotating disc, wherein the rotating disc is rotatably disposed within the housing, a film sheet is provided in the rotating disc, an image on the film sheet corresponds to a position of the projection hole, one side of the rotating disc is provided with a transmission member, and the transmission member corresponds to the driving hole; wherein the transmission member is a face gear; and an audio module, wherein the audio module comprises an audio board and a storage unit provided on the audio board, the storage unit stores audio data corresponding to the image on the film sheet, and the audio board is installed on the housing for transmitting data with the story projector main body;

wherein an installation seat is provided as a protrusion on an inner wall of the housing at a position corresponding to the driving hole, and the face gear is located within the installation seat.

2. The film disc for the story projector according to claim 1, wherein the housing is provided with a data hole, and the audio board is embedded in the data hole.

3. The film disc for the story projector according to claim 2, wherein an assembly groove is provided on an outer wall of the housing, the data hole is formed in a bottom wall of the assembly groove, the audio board is provided with a transmission connector, and the transmission connector extends through the data hole into the assembly groove.

4. The film disc for the story projector according to claim 3, wherein the transmission connector of the audio board is provided with metal contacts for plug-in electrical connection with a film recognition female socket of the story projector main body.

5. The film disc for the story projector according to claim 3, wherein a fixing post is provided inside the housing, a fixing hole cooperating with the fixing post is formed on the audio board, and the audio board is fixed to the fixing post through the fixing hole.

6. The film disc for the story projector according to claim 1, wherein positioning holes are formed on the housing and the rotating disc, and the positioning holes are configured to cooperate with a positioning module of the story projector main body to trigger rotational reset of the rotating disc.

7. The film disc for the story projector according to claim 6, wherein the positioning module is an infrared positioning module.

8. The film disc for the story projector according to claim 1, wherein a limiting post is provided on one side of the rotating disc opposite to the face gear, and a limiting hole cooperating with the limiting post is formed in the housing.

9. The film disc for the story projector according to claim 1, wherein limiting seats are provided on the inner wall of the housing at positions corresponding to two opposite sides of the rotating disc, and the limiting seats movably abut against a side wall of the rotating disc.

10. The film disc for the story projector according to claim 1, wherein the housing comprises a front housing and a rear housing, the front housing and the rear housing are fastened together to form an installation cavity, and the rotating disc and the audio module are disposed within the installation cavity.

* * * * *